(12) United States Patent
Huber et al.

(10) Patent No.: US 11,121,599 B2
(45) Date of Patent: Sep. 14, 2021

(54) SLOT SEALING COMPOUND, SLOT SEAL, AND METHOD FOR PRODUCING A SLOT SEAL

(71) Applicant: SIEMENS AKTIENGESELLSCHAFT, Munich (DE)

(72) Inventors: Jürgen Huber, Erlangen (DE); Bernhard Klaussner, Nuremberg (DE); Dieter Schirm, Breitengüssbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 204 days.

(21) Appl. No.: 15/036,653

(22) PCT Filed: Nov. 6, 2014

(86) PCT No.: PCT/EP2014/073868
§ 371 (c)(1),
(2) Date: May 13, 2016

(87) PCT Pub. No.: WO2015/071153
PCT Pub. Date: May 21, 2015

(65) Prior Publication Data
US 2016/0285338 A1 Sep. 29, 2016

(30) Foreign Application Priority Data
Nov. 14, 2013 (EP) .................... 13192857

(51) Int. Cl.
*H02K 3/493* (2006.01)
*H02K 3/30* (2006.01)
(Continued)

(52) U.S. Cl.
CPC ............ *H02K 3/493* (2013.01); *H01B 3/40* (2013.01); *H02K 3/30* (2013.01); *H02K 15/0018* (2013.01);
(Continued)

(58) Field of Classification Search
None
See application file for complete search history.

(56) References Cited

U.S. PATENT DOCUMENTS 3,447,009 A * 5/1969 Gegner ................. H02K 3/493
310/214
5,430,085 A * 7/1995 Acevedo ................. C08K 7/00
252/511

(Continued)

FOREIGN PATENT DOCUMENTS

| CN | 85108166 A | 7/1986 |
| CN | 1058305 A | 1/1992 |

(Continued)

*Primary Examiner* — Ian A Rummel
(74) *Attorney, Agent, or Firm* — Henry M. Feiereisen LLC

(57) ABSTRACT

The invention relates to a slot sealing compound (7) for an electrical machine that comprises at least one slot (2) with a slot opening (5) for receiving an electrical conductor arrangement (3). Said slot sealing compound (7) contains a magnetic filler material, particularly a soft-magnetic filler material, and a reactive resin mixture that comprises at least one resin component. In the interests of improving storage stability for said slot sealing compound (7), the components thereof are selected to be suitable for cationic polymerisation. A catalyst, provided to accelerate the cationic polymerisation of said reactive resin mixture, is also added to said slot sealing compound (7).

16 Claims, 1 Drawing Sheet

(51) Int. Cl.
*H02K 15/00* (2006.01)
*H01B 3/40* (2006.01)
*B29C 35/08* (2006.01)
*B29K 63/00* (2006.01)
*B29K 105/16* (2006.01)
*B29K 505/12* (2006.01)

(52) U.S. Cl.
CPC .. *B29C 35/0805* (2013.01); *B29C 2035/0827* (2013.01); *B29K 2063/00* (2013.01); *B29K 2105/16* (2013.01); *B29K 2105/162* (2013.01); *B29K 2505/12* (2013.01); *B29K 2995/0008* (2013.01)

(56) References Cited

U.S. PATENT DOCUMENTS

| | | | |
|---|---|---|---|
| 6,001,428 A | 12/1999 | Finter et al. | |
| 6,180,723 B1 * | 1/2001 | Keehan | C08F 8/08 |
| | | | 525/328.8 |
| 6,764,616 B1 * | 7/2004 | Beisele | C08L 63/00 |
| | | | 252/500 |
| 7,670,653 B2 | 3/2010 | Kaufhold et al. | |
| 7,687,963 B2 | 3/2010 | Klaussner et al. | |
| 2005/0096423 A1 * | 5/2005 | Jennrich | H05K 3/285 |
| | | | 524/492 |
| 2005/0123743 A1 * | 6/2005 | Martinazzo | C09D 5/033 |
| | | | 428/328 |
| 2005/0133720 A1 | 6/2005 | Ruessel et al. | |
| 2005/0194551 A1 | 9/2005 | Klaussner et al. | |
| 2007/0149073 A1 | 6/2007 | Klaussner et al. | |
| 2007/0182258 A1 | 8/2007 | Maeurer et al. | |
| 2008/0286505 A1 | 11/2008 | Klaussner et al. | |
| 2008/0299359 A1 | 12/2008 | Klaussner et al. | |
| 2009/0023843 A1 | 1/2009 | Beisele | |
| 2010/0244593 A1 | 9/2010 | Cordes et al. | |
| 2010/0264563 A1 | 10/2010 | Cordes et al. | |

FOREIGN PATENT DOCUMENTS

| | | |
|---|---|---|
| CN | 1065756 A | 10/1992 |
| CN | 1500127 A | 5/2004 |
| CN | 101615458 A | 12/2009 |
| CN | 101906237 A | 12/2010 |
| CN | 102570731 A | 7/2012 |
| DE | 1288186 B | 1/1969 |
| DE | 1299357 B | 7/1969 |
| EP | 1754733 A1 | 2/2007 |
| EP | 2365491 A1 | 9/2011 |
| SU | 1361678 A1 | 12/1987 |
| SU | 803806 A1 | 4/1994 |
| WO | WO 2006100291 A1 | 9/2006 |

\* cited by examiner

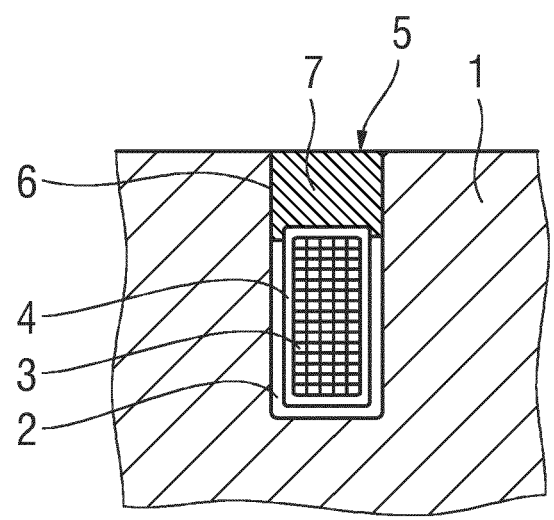

SLOT SEALING COMPOUND, SLOT SEAL, AND METHOD FOR PRODUCING A SLOT SEAL

CROSS-REFERENCES TO RELATED APPLICATIONS

This application is the U.S. National Stage of International Application No. PCT/EP2014/073868, filed Nov. 6, 2014, which designated the United States and has been published as International Publication No. WO 2015/071153 and which claims the priority of European Patent Application, Serial No. 13192857.4, filed Nov. 14, 2013, pursuant to 35 U.S.C. 119(a)-(d).

BACKGROUND OF THE INVENTION

The invention relates to a slot sealing compound for an electric machine, which has at least one slot with a slot opening for receiving an electric conductor arrangement, containing a magnetic filler material, in particular a soft-magnetic filler material, and a reactive resin mixture that has at least one resin component. The invention further relates to a slot seal and to a method for producing a slot seal for an electric machine.

The slots of electric machines serve to receive insulated electrical conductors or conductor arrangements. They normally have a slot opening, by way of which the conductor or conductor arrangement is placed into the slot. High-voltage machines in particular work with what are known as "open slots", wherein the slot opening extends beyond the complete slot width. The slot opening must therefore be sealed after inserting the electrical conductor or conductor arrangement, in order to prevent the conductor from rising out of the slot during operation of the electric machine.

The slot seal for such slot openings is typically embodied with solid sealing elements, which are known as slot shims. These slot shims are manufactured for instance from technical laminated compression molded materials by means of mechanical processing. Alternatively, they can be manufactured from thermoplastic or duroplastic molding compounds using extrusion or injection molding.

In order to improve the magnetic flux field in the region of the slot opening, the slot seals are embodied to be partially soft-magnetic for instance. In this way the slot seals are embodied in the form of slot shims, made of compression molded materials filled with iron. Such a soft-magnetic slot seal is however usually glued to the slot in order to achieve a good tight fit. Otherwise, there is the danger that the slot shim detaches due to operating loads (thermal load, thermomechanical alternating load, magnetic alternating load, environmental influences). This bond can only be performed reliably with significant outlay.

A prefabricated sealing element, which is used as a slot seal, is described in WO 2006/100291 A1 for instance. Here the sealing element consists of a material with a thermoplastic polymer material and a magnetic filler material.

A further form of the soft-magnetic slot seal are epoxy resins which can be hardened and filled with iron powder, such as are described for instance in the publications DE 1 288 186 and DE 1 299 357. The epoxy resins are pushed into the slot opening as a paste-type compound and are then thermally cured. Such a slot seal is characterized compared with the soft-magnetic shims by a durable tight fit.

SUMMARY OF THE INVENTION

The object underlying the invention is to specify an improved, hardenable, magnetic slot seal.

The object is achieved in accordance with the invention by a slot sealing compound for an electric machine, which has at least one slot with a slot opening for receiving an electric conductor arrangement, containing a magnetic filler material, in particular a soft-magnetic filler material, and a reactive resin mixture, which has at least one resin component, wherein the slot sealing compound also contains a catalyst, which is provided to accelerate a cationic polymerization of the reactive resin mixture.

The catalyst is preferably a material made of at least one of the groups of organic ammonium, sulphonium, phosphonium or imidazolium salts or a mixture containing at least one of these salts.

A magnetic filler material is also to be understood here as a magnetic filler material mixture. A catalyst mixture is if necessary also referred to as a catalyst.

The invention is based on the idea to provide a 1-component reactive resin mixture for use in the slot sealing compound, which is hardened by means of a cationic polymerization. The reactive resin mixture thus only consists of one or a number of resin components, which, during use of the slot sealing compound as a slot seal, are continuously adjoined to a growing polymer. A cationic polymerization of the at least one resin component is enabled and accelerated by the catalyst (or the catalyst mixture), which is mixed into the slot sealing compound. Based on the reactive resin mixture, the catalyst has a percentage by weight of at most 5% by weight, in particular the percentage by weight of the catalyst amounts to less than 1% by weight of the reactive resin mixture.

The major advantage of such a slot sealing compound which is hardened on the basis of a cationic polymerization is that the finished slot sealing compound has long storage stabilities of a number of weeks at an ambient temperature. Even at raised temperatures of 35° C. to 45° C., storage periods of a number of days to weeks are possible. With a raised air humidity, i.e. above the average atmospheric air humidity, the slot sealing compound is also storage stable for a number of days. The slot sealing compound is thus suited to storage and transportation as a ready-mix, which is used without needing to add further components at the site of application.

The reactive resin mixture is suited here to an application temperature range of above 155° C., thereby easily covering the temperature class F or even higher temperature classes.

The resin component of the reactive resin mixture is expediently an epoxy resin. An epoxy resin is particularly suited to a multiple adjoining of epoxy groups, i.e. for a polymerization. A thermal or radiation-initiated ring opening polymerization forms the basis of the cationic polymerization of epoxy resins. Used here as initiators are substances which, as a result of thermolysis or photolysis, form very strong acids which start the afore-described polymerization. Advantages of the polymerization of the reactive resin mixture are air insensitivity during the hardening, minimal shrinkage and resulting therefrom an improved adhesion to metals and a post-hardening in the dark.

The magnetic filler material and the catalyst are preferably selected such that the magnetic filler material binds or inhibits the catalyst at an ambient temperature and the initiation only takes place after a temperature and/or radiation treatment, in particular with UV light, which causes the slot seal to harden. Alternatively or in addition to the magnetic filler material as a catalyst inhibitor, the slot sealing compound contains an additive, which binds or inhibits the catalyst at an ambient temperature so that the hardening of the slot seal likewise takes place with the conditions described in conjunction with the magnetic filler material. Silicic acids, aluminum trihydrate, magnesium hydroxide etc. are suited hereto.

The slot sealing compound is also storage stable with a more open storage setup in a damp environment, i.e. with an air humidity of greater than 50%. No water is generally absorbed in the slot sealing compound on account of its chemical composition. Similarly, a hardening temperature from approx. 70° C. is likewise possible on account of the chemical composition of the slot sealing compound.

According to a preferred embodiment variant, the slot sealing compound also contains organic and/or inorganic nanoparticles, in particular core-shell nanoparticles or inorganic nanoparticles based on SiO2. The nanoparticles improve in particular the flow behavior of the reactive resin mixture and the impact strength of the hardened slot seal.

According to a further preferred embodiment, the slot sealing compound has a glass transition temperature of at least 180° C. This is advantageous since a clear change in the mechanical and electrical properties is associated with the exceeding of the glass transition temperature. In order to enable the use of the slow seal with the highest possible temperatures, a glass transition temperature of 180° C. or more is thus set by the composition of the slot sealing compound.

In respect of a high magnetic permeability of the slot seal, provision is made for the magnetic filler material or the magnetic filler material mixture to preferably have a proportion of at least 85% by weight in the slot sealing compound.

Moreover, a higher proportion of the magnetic filler material is reached by the magnetic filler material advantageously being present in the form of bimodal to multimodal particle size distributions. This means that the magnetic filler material has at least two particle size distributions, wherein the smaller particles in particular fill the spaces between the larger particles. The highest possible packing density is enabled in this way, which in turn results in a high permeability. The magnetic filler material contains an iron powder, in particular a sponge iron powder or a carbonyl iron powder. The iron powder has an average particle size between approx. 40 µm and 500 µm, in particular approx. 200 µm to 300 µm. Particle sizes of smaller than 40 µm or larger than 500 µm are basically also possible.

Moreover, it is advantageous if the slot sealing compound expediently contains fibrous filler materials with a fiber length of 50 µm to 10000 µm, in particular of 100 µm to 5000 µm, in particular of 100 µm to 3000 µm. Such fibrous filler materials produce an increase in the mechanical stability. Inorganic fibers such as glass fibers or also organic fibers such as aramid fibers are used for instance as fibrous filler materials. Moreover, any fiber mixtures are also possible.

The slot sealing compound preferably has a storage stability of several days at a temperature of up to 45° and/or an increased air humidity of more than 50%.

The object is further inventively achieved by a slot seal of an electric machine from a slot sealing compound as claimed in one of the afore-described embodiments.

The object is also inventively achieved by a method for producing a slot seal for an electric machine, which has at least one slot with a slot opening for receiving an electric conductor arrangement, wherein a reactive resin mixture comprising at least one resin component, a magnetic filler material, in particular a soft-magnetic filler material and a catalyst are mixed with one another to form a slot sealing compound.

The advantages and preferred embodiments already cited in respect of the slot sealing compound can be analogously transferred to the slot seal and to the method for producing a slot seal.

The conductor arrangement is preferably introduced into the slot and the slot sealing compound is used to seal the slot opening and is then heat treated in order to initiate the cationic polymerization.

Advantageously, after inserting the slot sealing compound into the slot, only the surface of the slot sealing compound is firstly heat and/or UV treated in respect of a superficial hardening. The surface of the slot sealing compound is preferably firstly hardened here by means of UV light, wherein the lower layers of the slot sealing compound are still not polymerized. This method step ensures a dimensional stability of the slot sealing compound prior to the complete cationic polymerization.

BRIEF DESCRIPTION OF THE DRAWING

An exemplary embodiment of the invention is explained in more detail on the basis of a drawing. The sole FIGURE here shows an exemplary embodiment of a stator of an electric machine having a magnetic slot seal.

DETAILED DESCRIPTION OF PREFERRED EMBODIMENTS

An exemplary embodiment of a stator 1 of an electric machine is shown in a partial cross-section in the FIGURE. The stator 1 comprises a slot 2, in which an electric conductor arrangement 3 is positioned. The conductor arrangement 3 (only shown schematically) can be embodied as an electrical individual conductor or also as a combination of a number of electrical sub-conductors. It is surrounded with an electrical insulation 4 and is part of a coil winding of the stator 1. The slot 2 and the conductor arrangement 3 can basically also be provided in a rotor of the electric machine instead of in the stator 1.

In the region of a slot opening 5, a slot seal 6 is arranged within the slot 2. The slot seal is embodied from a slot sealing compound 7, which contains a soft-magnetic filler material and a reactive resin mixture. The reactive resin mixture is composed at least from a resin component, in the exemplary embodiment shown an epoxy resin, and a catalyst for a cationic polymerization of the epoxy resin. The slot sealing compound 7 can also contain organic and/or inorganic nanoparticles and fibrous filler materials.

The proportion of the magnetic filler material in the slot sealing compound 7 amounts to at least 85% by weight. The proportion of the catalyst in the reactive resin mixture amounts at most to 5% by weight, in particular the percentage by weight of the catalyst amounts to less than 1% by weight of the reactive resin mixture.

The components of the slot sealing compound 7 form a ready-mix, which is storage stable at room temperature and/or at the same time as a high air humidity. Even with a raised air temperature, e.g. of 45° C., the ready-mix is storage stable for a number of days to weeks and its components do not react disadvantageously with one another in respect of processing and final properties. The ready mix can thus be stored and transported during periods of several days or weeks. In the exemplary embodiment shown, the slot sealing compound is firstly treated with UV light at the site of application, once it is inserted into the slot opening 5, so that the surface of the slot sealing compound is hardened. The slot sealing compound 7 is then subjected to a heat treatment, in particular with a hardening temperature of 70° C. or higher, so that the lower layers of the slot sealing compound 7 thus also polymerize.

A slot sealing compound 7 manufactured in this way is characterized by a high chemical resistance, by a high temperature resistance and mechanical stability, by a high magnetic permeability on account of the high proportion of magnetic filler material. By virtue of its composition, the slot sealing compound 7 has in particular a glass transition temperature of more than 180° C. The area of application of the slot seal 6 lies here in the temperature class F or greater, i.e. during operation of the electric machine, a temperature of in particular 155° C. can be reached and if necessary exceeded. Moreover, the slot sealing compound does not contain any toxic components that are legally required to be labeled.

What is claimed is:

1. A slot sealing compound for filling into a slot opening of an electric machine that accommodates an electric conductor arrangement for the electric machine, comprising:
    a reactive resin mixture containing at least one resin component;
    a catalyst configured to accelerate a cationic polymerization of the reactive resin mixture;
    a magnetic filler material; and an additive configured to bind or inhibit the catalyst at a temperature of up to 45° C. so as to prevent the catalyst from accelerating the cationic polymerization of the reactive resin mixture and thereby render the slot sealing compound storage stable up to a temperature of 45° C., said additive is selected from the group consisting of aluminum trihydrate, magnesium hydroxide and their salts.

2. The slot sealing compound of claim 1, wherein the magnetic filler material is a soft-magnetic filler material.

3. The slot sealing compound of claim 1, wherein the catalyst is at least one substance selected from the group consisting of organic ammonium salt, sulphonium salt, phosphonium salt, and imidazolium salt.

4. The slot sealing compound of claim 1, wherein the catalyst has a percentage by weight of at most 5% by weight.

5. The slot sealing compound of claim 1, wherein the catalyst has a percentage by weight of at most 1% by weight of the reactive resin mixture.

6. The slot sealing compound of claim 1, wherein the resin component is an epoxy resin.

7. The slot sealing compound of claim 1, further comprising organic and/or inorganic nanoparticles.

8. The slot sealing compound of claim 1, having a glass transition temperature of at least 180° C.

9. The slot sealing compound of claim 1, wherein the magnetic filler material has a percentage by weight, which amounts to at least 85% by weight.

10. The slot sealing compound of claim 1, wherein the magnetic filler material is present in the form of bimodal to multimodal particle size distributions.

11. The slot sealing compound of claim 1, having a storage stability of several days at a temperature of up to 45° and/or an air humidity of more than 50%.

12. A slot seal, comprising the slot sealing compound of claim 1.

13. A method for producing a slot seal in an electric machine, comprising,
    mixing a reactive resin mixture, comprising at least one resin component together with a magnetic filler material and a catalyst to accelerate a cationic polymerization of the reactive resin mixture and an additive selected from the group consisting of aluminum trihydrate, magnesium hydroxide and their salts to form a slot sealing compound as a slot seal for an electric machine, the slot sealing compound being storage stable up to a temperature of 45° C.,
    introducing a conductor arrangement into a slot of the electric machine,
    placing the slot sealing compound to seal a seal opening of the slot; and
    thereafter subjecting the slot sealing compound to a heat treatment initiating the cationic polymerization of the slot sealing compound.

14. The method of claim 13, further comprising hardening initially only a surface of the slot sealing compound through heat treatment to realize a superficial hardening.

15. The method of claim 13, further comprising hardening initially only a surface of the slot sealing compound through UV treatment to realize a superficial hardening.

16. The method of claim 13, wherein the polymerization of the slot sealing compound takes place at a hardening temperature from about 70° C.

* * * * *